US007941914B2

(12) United States Patent
Castiglione et al.

(10) Patent No.: US 7,941,914 B2
(45) Date of Patent: May 17, 2011

(54) TOOL FOR TERMINATED CABLE ASSEMBLIES

(75) Inventors: Joseph N. Castiglione, Cedar Park, TX (US); Steven Feldman, Cedar Park, TX (US); Richard J. Scherer, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 284 days.

(21) Appl. No.: 12/116,978

(22) Filed: May 8, 2008

(65) Prior Publication Data

US 2009/0277003 A1 Nov. 12, 2009

(51) Int. Cl.
*B23P 19/00* (2006.01)

(52) U.S. Cl. ............ 29/764; 29/762; 29/426.6; 29/278; 29/881; 439/592; 439/66; 439/108; 439/857; 7/107; 7/138

(58) Field of Classification Search .................... 29/764, 29/278, 762, 758, 739, 280, 881, 884, 747, 29/566, 33 M, 426.6; 439/592–598, 66, 108, 439/857; 7/107, 138
See application file for complete search history.

(56) References Cited

U.S. PATENT DOCUMENTS

| | | | | |
|---|---|---|---|---|
| 3,210,832 | A * | 10/1965 | Kalen | 29/747 |
| 3,747,047 | A * | 7/1973 | Carter et al. | 439/141 |
| 3,844,013 | A | 10/1974 | Hall, Jr. | |
| 4,083,101 | A * | 4/1978 | Coller | 29/739 |
| 4,171,565 | A * | 10/1979 | Boudreau et al. | 29/739 |
| 4,285,123 | A * | 8/1981 | Chisholm | 29/764 |
| 4,380,118 | A * | 4/1983 | Driver et al. | 29/747 |
| 4,425,704 | A * | 1/1984 | Cline | 29/764 |
| 4,494,305 | A * | 1/1985 | Safai | 29/764 |
| 4,762,507 | A * | 8/1988 | Rudy et al. | 439/595 |
| 5,263,876 | A * | 11/1993 | Johnescu et al. | 439/620.1 |
| 5,292,260 | A | 3/1994 | Sinisi et al. | |
| 5,324,213 | A | 6/1994 | Frantz | |
| 5,551,147 | A | 9/1996 | Morse et al. | |
| 6,047,464 | A * | 4/2000 | Chadbourne et al. | 29/764 |
| 6,363,560 | B1 * | 4/2002 | Kesinger | 7/107 |
| 6,880,239 | B1 * | 4/2005 | Jennings et al. | 29/739 |
| 7,257,888 | B2 | 8/2007 | Nelson et al. | |
| 2006/0270256 | A1 | 11/2006 | Huss, Jr. | |
| 2007/0197095 | A1 | 8/2007 | Feldman et al. | |
| 2008/0020615 | A1 | 1/2008 | Feldman et al. | |

OTHER PUBLICATIONS

International Search Report, Form PCT/ISA/210, 63662WO003.
U.S. Appl. No. 60/980,512—Inventor: Steven Feldman—Filing Date: Oct. 17, 2007.

* cited by examiner

*Primary Examiner* — Derris H Banks
*Assistant Examiner* — Jeffrey Carley
(74) *Attorney, Agent, or Firm* — Johannes P. M. Kusters

(57) ABSTRACT

A tool includes a housing and a plunger supported by the housing. The housing has one or more tines configured to unlatch at least one terminated cable assembly from an electrical connector assembly. The plunger is configured to at least partially remove the at least one terminated cable assembly from the electrical connector assembly. The tool can be used as an extraction and insertion tool facilitating the repair of high speed electrical connectors.

18 Claims, 10 Drawing Sheets

TOOL FOR TERMINATED CABLE ASSEMBLIES

TECHNICAL FIELD

The present invention relates to high speed electrical connectors. In particular, the present invention relates to a tool for extracting and inserting terminated cable assemblies of high speed electrical connectors that provide high signal line density while also providing shielded controlled impedance (SCI) for the signal lines.

BACKGROUND

Interconnection of integrated circuits to other circuit boards, cables or electronic devices is known in the art. Such interconnections typically have not been difficult to form, especially when the signal line densities have been relatively low, and when the circuit switching speeds (also referred to as edge rates or signal rise times) have been slow when compared to the length of time required for a signal to propagate through a conductor in the interconnect or in the printed circuit board. As user requirements grow more demanding with respect to both interconnect sizes and circuit switching speeds, the design and manufacture of interconnects that can perform satisfactorily in terms of both physical size and electrical performance have grown more difficult. As a result, the necessary repair of these interconnects has become more challenging.

Tools have been developed to assist in the necessary repair of interconnects. Although many of these tools are useful, there is still a need in the art for extraction and insertion tool designs that facilitate the repair of high speed electrical connectors.

SUMMARY

In one aspect, the present invention provides a tool comprising a housing and a plunger supported by the housing. The housing has one or more configured to unlatch at least one terminated cable assembly from an electrical connector assembly. The plunger is configured to at least partially remove the at least one terminated cable assembly from the electrical connector assembly.

In another aspect, the present invention provides a method comprising providing an electrical connector assembly including a plurality of terminated cable assemblies and providing a tool comprising a housing and a plunger supported by the housing. The housing has one or more tines configured to unlatch at least one terminated cable assembly from the electrical connector assembly. The plunger is configured to at least partially remove the at least one terminated cable assembly from the electrical connector assembly. The method further comprises inserting the one or more tines into the electrical connector assembly thereby unlatching the at least one terminated cable assembly, pushing the plunger thereby at least partially removing the at least one terminated cable assembly from the electrical connector assembly, and removing the at least one terminated cable assembly from the electrical connector assembly.

In another aspect, the present invention provides a method comprising providing an electrical connector assembly including a plurality of first terminated cable assemblies each having one or more contact elements, providing a tool comprising one or more tines configured to deflect the one or more contact elements, inserting the one or more tines into the electrical connector assembly thereby deflecting at least one contact element of at least one first terminated cable assembly, inserting at least one second terminated cable assembly into the electrical connector assembly adjacent the at least one first terminated cable assembly, and removing the one or more tines from the electrical connector assembly.

The above summary of the present invention is not intended to describe each disclosed embodiment or every implementation of the present invention. The Figures and detailed description that follow below more particularly exemplify illustrative embodiments.

DETAILED DESCRIPTION

In the following detailed description of the preferred embodiments, reference is made to the accompanying drawings that form a part hereof. The accompanying drawings show, by way of illustration, specific embodiments in which the invention may be practiced. It is to be understood that other embodiments may be utilized, and structural or logical changes may be made without departing from the scope of the present invention. The following detailed description, therefore, is not to be taken in a limiting sense, and the scope of the invention is defined by the appended claims.

Figure 1:
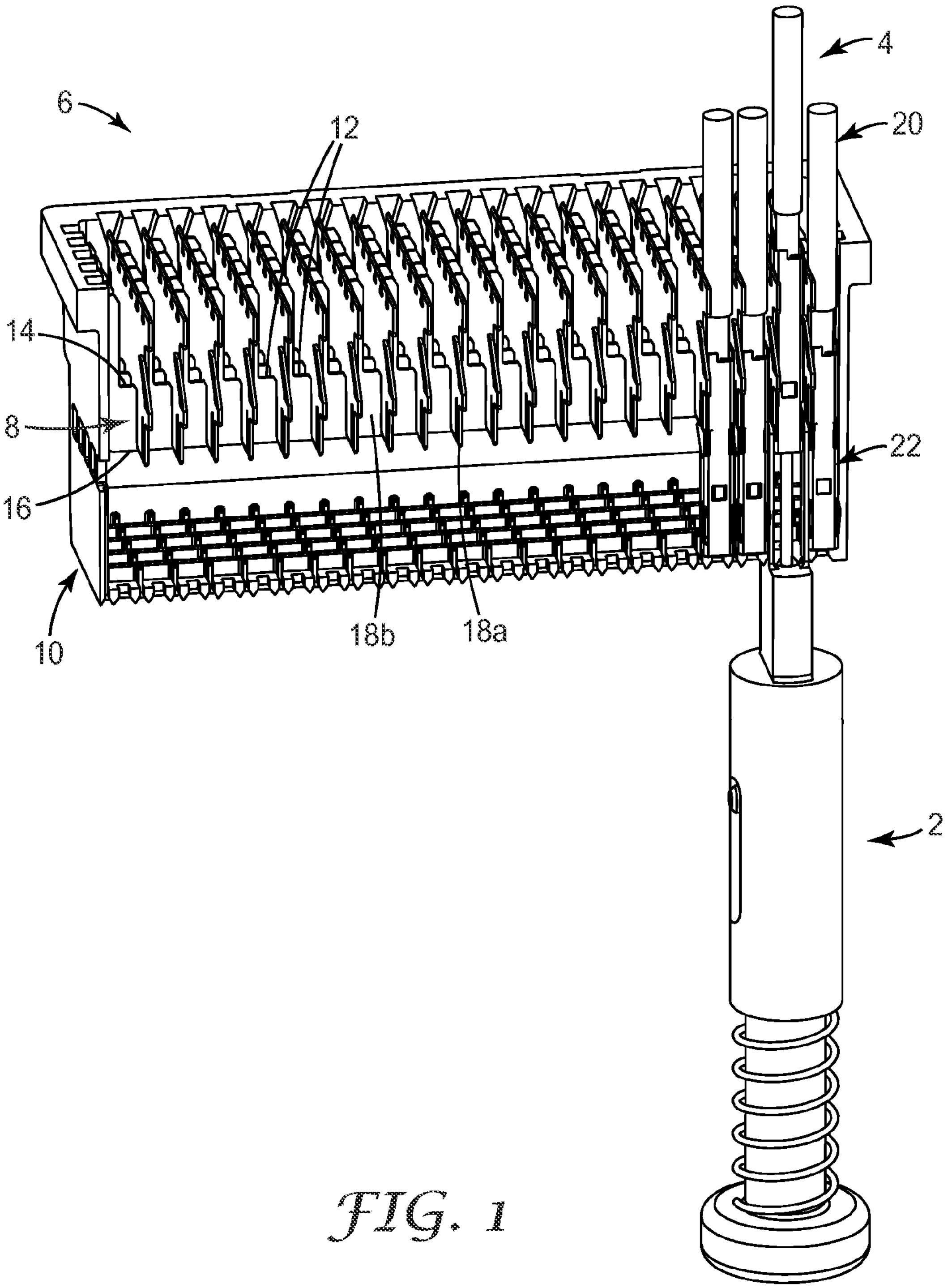
FIG. 1 is a perspective cutaway view of an exemplary embodiment of a tool according to an aspect of the present invention in the process of removing a terminated cable assembly from an electrical connector assembly.

FIG. 1 illustrates an exemplary embodiment of a tool according to an aspect of the present invention. In FIG. 1, tool 2 is in the process of removing a terminated cable assembly 4 from an electrical connector assembly 6.

Electrical connector assembly 6 includes a retainer or organizer plate 8, a connector assembly housing or adapter 10, and a plurality of terminated cable assemblies 4. Electrical connector assembly 6 is configured to mate with a header (not shown), configured for mounting on a printed circuit board (not shown) to form an electrical connection between electrical cables 20 (described in detail below) and the printed circuit board. Although it is illustrated and described herein that tool 2 is used with electrical connector assembly 6 and terminated cable assembly 4, tool 2 may be used with any suitable electrical connector assembly and terminated cable assembly. In one aspect, elements of electrical connector assembly 6 and terminated cable assembly 4 may be constructed in a manner the same as or similar to what is taught in U.S. Patent Publication No. US 2007/0197095 A1, publication date Aug. 23, 2007, U.S. Patent Publication No. US 2008/0020615 A1, publication date Jan. 24, 2008, and U.S. Provisional Patent Application No. 60/980,512, filed Oct. 17, 2007.

Organizer plate 8 of electrical connector assembly 6 is configured to receive, secure, and manage a plurality of terminated cable assemblies 4. Organizer plate 8 includes a plurality of apertures 12 extending from a first side 14 to a second side 16 of organizer plate 8. For clarity of illustration, only four terminated cable assemblies 4 are shown in FIG. 1, although organizer plate 8 is intended to accommodate a terminated cable assembly 4 in each aperture 12. Connector assembly housing or adapter 10 is configured to receive organizer plate 8, and functions to adapt organizer plate 8 to a particular application or use of organizer plate 8. In the embodiment illustrated in FIG. 1, connector assembly housing or adapter 10 is configured to allow terminated cable assemblies 4 in organizer plate 8 to be mated with a pin header (not shown). In the illustrated embodiment, organizer plate 8 is formed of a plurality of transversely positioned and interconnected metal plates 18*a* and 18*b* (collectively referred to herein as "plates 18") having interlocking slots (not shown), such that when assembled, the plurality of metal plates 18 define the plurality of apertures 12. In other embodiments, organizer plate 8 may be formed by methods such as, e.g., molding and/or machining of polymeric material, molding and/or machining of metal, or construction of a metal frame overmolded with a polymeric material.

Figure 2:
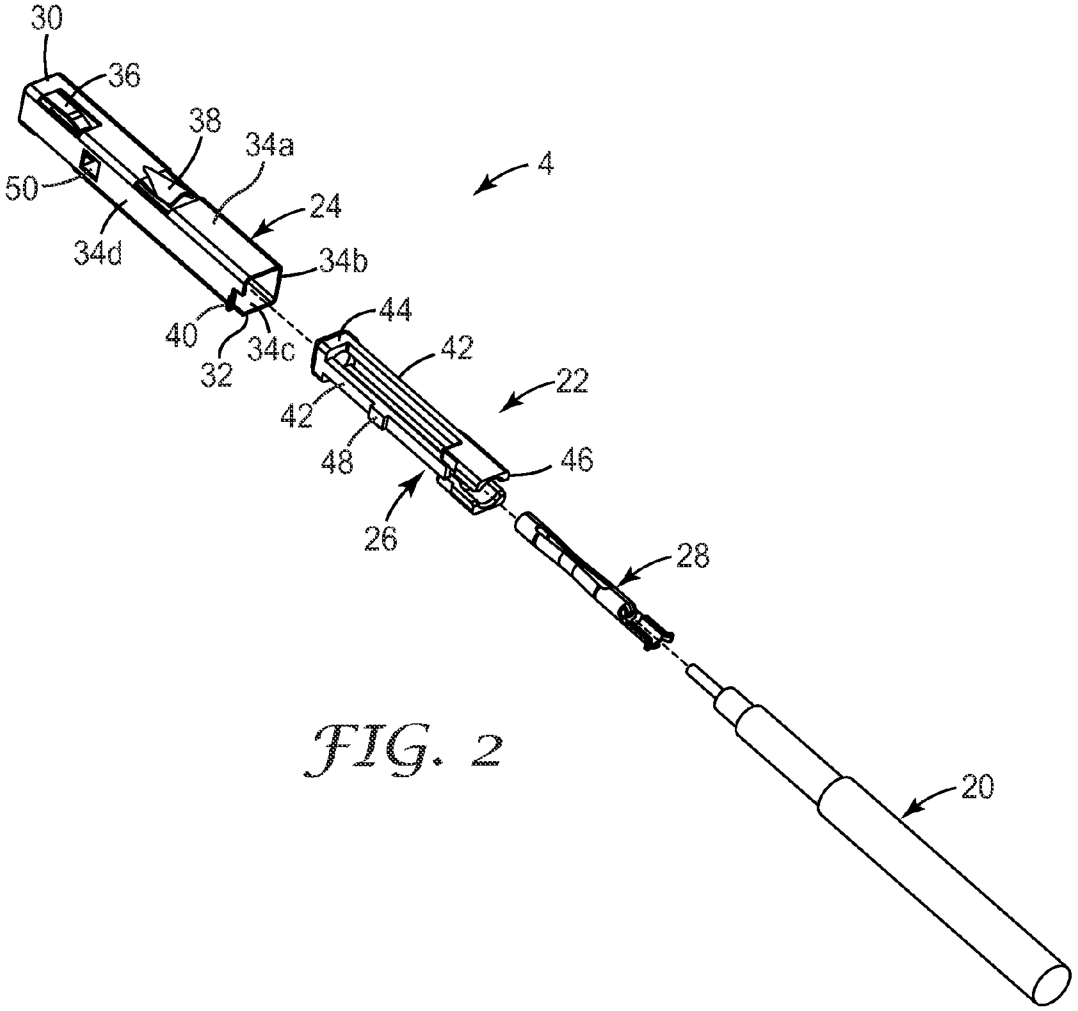
FIG. 2 is an exploded perspective view of one of the terminated cable assemblies of FIG. 1.

As best seen in FIG. 2, terminated cable assembly 4 includes an electrical cable 20 and an electrical cable termination 22. Exemplary embodiments of electrical connector assemblies are described and illustrated herein as used with a single type of electrical cable 20. However, these and other exemplary embodiments may have other types of electrical cables 20 having signal, power, and/or ground elements. Electrical cables 20 may be, but are not limited to, single wire cables (e.g., single coaxial cables and single twinaxial cables) and multi-wire cables (e.g., multiple coaxial cables, multiple twinaxial cables, and twisted pair cables). Further, different types and configurations of electrical cables 20 and electrical cable terminations 22 may be used simultaneously with the electrical connector assemblies. For example, a portion of electrical cables 20 and electrical cable terminations 22 retained by connector assembly housing or adapter 10 may be coaxial cables and terminations, while another portion of electrical cables 20 and electrical cable terminations 22 retained by connector assembly housing or adapter 10 may be twinaxial (or other) cables and terminations.

Electrical cable termination 22 includes a longitudinal electrically conductive shield element 24, an insulator 26, and a single electrical contact 28.

Electrically conductive shield element 24 has a front end 30, a back end 32, and side surfaces 34*a*-34*d* (collectively referred to herein as "sides 34") defining a non-circular transverse cross-section. Although the illustrated embodiment includes four sides 34 defining a substantially square transverse cross-section, shield element 24 may have other numbers of sides defining other generally rectangular or non-circular transverse cross-sections. In other embodiments, shield element 24 may have a generally curvilinear (such as, e.g., a circular) transverse cross-section. Shield element 24 includes laterally protruding resilient contact elements 36 disposed on opposed side surfaces 34*a* and 34*c*. In other embodiments, shield element 24 includes only a single contact element 36. A latch member 38 extends from at least one of sides 34. Latch member 38 is configured to retain electrical cable termination 22 in organizer plate 8 configured to receive, secure, and manage a plurality of terminated cable assemblies 4. In one embodiment, latch member 38 is designed to yield (i.e., deform) at a lower force than required to break the attached electrical cable 20, so that a terminated cable assembly 4 can be pulled out of organizer plate 8 for the purpose of replacing or repairing an individual terminated cable assembly. In the illustrated embodiment of FIG. 2, latch member 38 is shown on a same side 34*a* as one of the contact elements 36. However, in other embodiments, latch member 38 may additionally, or alternatively, be positioned on a side 34 of the shield element 24 that does not include a contact element 36. Shield element 24 may further include a keying member, in the form of tab 40, laterally extending from back end 32 of shield element 24. Tab 40 is configured to ensure that electrical cable termination 22 is inserted into organizer plate 8 in the correct predetermined orientation. If electrical cable termination 22 is not properly oriented within organizer plate 8, electrical cable termination 22 cannot be fully inserted. In one embodiment, tab 40 is deformable (such as by the use of a tool or the application of excess force in the insertion direction) and may be straightened to allow a damaged or defective electrical cable termination 22 to be pushed completely through organizer plate 8, such that the damaged or defective components can be replaced or repaired. Although the figure shows that shield element 24 includes contact element 36, in other embodiments, other contact element configurations, such as, e.g., Hertzian bumps, may be used in place of contact element 36.

Insulator 26 includes one or more insulative spacer bars 42. One or more spacer bars 42 are shaped to receive one or more electrical contacts 28 and are configured for slidable insertion into shield element 24, such that the one or more electrical contacts 28 lie substantially parallel to a longitudinal axis of shield element 24. One or more spacer bars 42 are configured to guide and optionally support one or more electrical contacts 28 during their insertion into insulator 26. In a preferred embodiment, one or more spacer bars 42 are shaped and positioned relative to one or more electrical contacts 28 and shield element 24 such that air is the dominant dielectric material surrounding one or more electrical contacts 28, so as to lower the effective dielectric constant of electrical cable termination 22 and thereby lower the characteristic impedance of terminated cable assembly 4 closer to the desired target value, such as, for example, 50 ohms. Insulator 26 further includes a first insulative member 44 disposed within shield element 24 adjacent front end 30, and a second insulative member 46 disposed within shield element 24 adjacent back end 32. First and second insulative members 44, 46 are configured to provide structural support to insulator 26. A spacer bar 42 of insulator 26 includes a laterally protruding positioning and latching element 48 that snaps into a mating opening 50 in shield element 24 to properly position and retain insulator 26 in shield element 24. As insulator 26 (containing one or more electrical contacts 28) is inserted into shield element 24, spacer bar 42 with positioning and latching element 48 deflects inwardly (toward the one or more electrical contacts 28) until engaging with mating opening 50 in shield element 24.

Figure 3A:
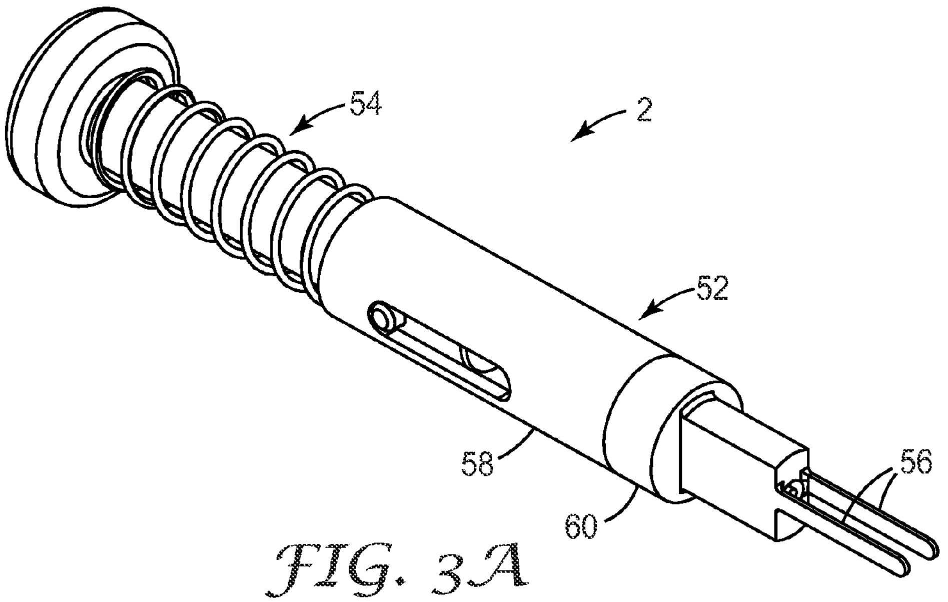
FIGS. 3A-3B are perspective views of the tool of FIG. 1 in an initial and active stage respectively.
Figure 3B:
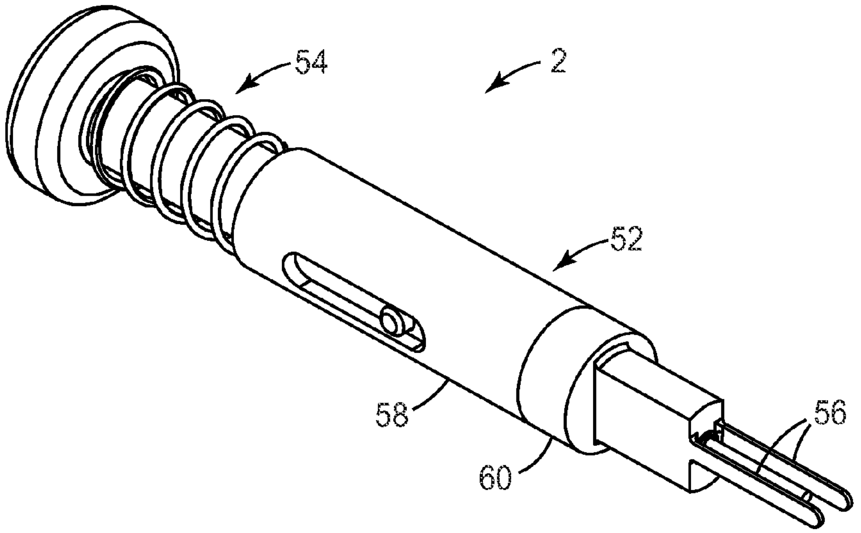
Figure 4:
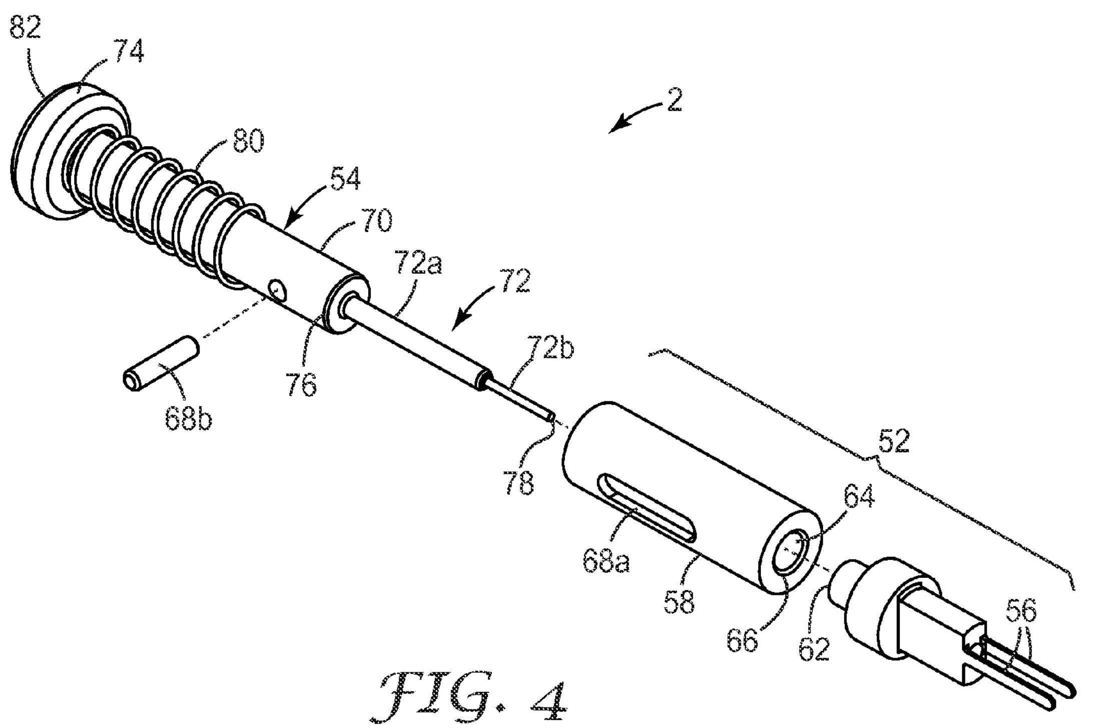
FIG. 4 is an exploded perspective view of the tool of FIG. 1.

Referring to FIGS. 1, 3A, 3B, and 4, tool 2 includes a housing 52 and a plunger 54. Housing 52 includes two tines 56 configured to unlatch at least one terminated cable assembly 4 from electrical connector assembly 6. Housing 52 includes a first housing part 58 and a second housing part 60. Tines 56 are part of second housing part 60, which is removably attached to first housing part 58. Effectively, this construction facilitates tines 56 to be easily removed from housing 52, e.g., for repair or replacement. Second housing part 60 may be assembled to first housing part 58 using any suitable method/structure, including but not limited to snap fit, friction fit, press fit, mechanical clamping, and adhesive. In the embodiment of FIGS. 3A, 3B, and 4, second housing part 60 is assembled to first housing part 58 using press fit between a post 62 extending from second housing part 60 and an opening 64 in first housing part 58. To facilitate this assembly, opening 64 includes a chamfer or radius 66. In other embodiments, tines 56 may be permanently or removably attached to a one-part housing 52 using any suitable method/structure, including but not limited to snap fit, friction fit, press fit, mechanical clamping, soldering, welding, and adhesive. Although in the embodiment illustrated in FIGS. 3A, 3B, and 4 housing 52 of tool 2 is tubular, in other embodiments, housing 52 may be partially tubular, non-tubular, or may have any other suitable shape.

Plunger 54 is supported by housing 52 and configured to at least partially remove at least one terminated cable assembly 4 from electrical connector assembly 6. Plunger 54 is cylindrical and is configured to slide relative to housing 52 during operation of tool 2. Although in the embodiment illustrated in FIGS. 3A, 3B, and 4 plunger 54 is cylindrical, in other embodiments, plunger 54 may be partially cylindrical, non-cylindrical, or may have any other suitable shape. Plunger 54 includes a plunger body 70, a plunger extension 72, and a plunger head 74.

Plunger body 70 is configured to slidably fit in housing 52 and may be configured to support a spring element, such as, e.g., spring element 80 (described in detail below). Plunger body 70 has a radius or chamfer 76 to facilitate assembly of plunger 54 into housing 52.

Plunger extension 72 extends from plunger body 70 and includes a first extension portion 72*a* and a second extension portion 72*b*. First extension portion 72*a* has a smaller diameter than the diameter of plunger body 70 and second extension portion 72*b* has a smaller diameter than the diameter of first extension portion 72*a*. This two-step configuration facilitates accurate placement of front end 78 of plunger 54 against a single terminated cable assembly 4 to facilitate its removal from electrical connector assembly 6 while maintaining the rigidity of plunger extension 72. In the embodiment of FIGS. 3A, 3B, and 4, plunger 54 is monolithic. In other embodiments, plunger extension 72 may be a separate element permanently or removably attached to plunger body 70. Plunger extension 72 may then be assembled to plunger body 70 using any suitable method/structure, including but not limited to snap fit, friction fit, press fit, mechanical clamping, soldering, welding, and adhesive. Effectively, a construction wherein plunger extension 72 is removably attached to plunger body 70 would facilitate plunger extension 72 to be easily removed from plunger body 70 for repair or replacement, for example.

Plunger head 74 is configured for manual operation of tool 2 and is positioned at back end 82 of plunger 54. Plunger head 74 has a larger diameter than the diameter of plunger body 70 to accommodate manual operation by a human finger, for example. Plunger head 74 may be configured to support a spring element, such as, e.g., spring element 80 (described in detail below). In the embodiment of FIGS. 3A, 3B, and 4, plunger 54 is monolithic. In other embodiments, plunger head 74 may be a separate element permanently or removably attached to plunger body 70. Plunger head 74 may then be assembled to plunger body 70 using any suitable method/structure, including but not limited to snap fit, friction fit, press fit, mechanical clamping, soldering, welding, and adhesive. A construction wherein plunger head 74 is removably attached to plunger body 70 would facilitate different shapes and/or sizes of plunger head 74 to be easily installed, for example.

In the embodiment of FIGS. 3A, 3B, and 4, housing 52 includes a slot 68*a* and plunger 54 includes a stop pin 68*b*. Slot 68*a* and stop pin 68*b* (collectively referred to herein as "stop element 68") are configured to limit movement of plunger 54 relative to housing 52. In alternative embodiments, movement limitation of plunger 54 relative to housing 52 may be achieved by alternative designs of one or more stop elements 68.

In the embodiment of FIGS. 3A, 3B, and 4, plunger body 70 is configured to support a spring element 80. Spring element 80 is configured to retain plunger 54 in an initial stage relative to housing 52 when tool 2 is not in use. This way, second extension portion 72*b* of plunger extension 72 stays protected within housing 52 to prevent damage or breakage. Also, spring element 80 is configured to return plunger 54 to the initial stage relative to housing 52 after operation of tool 2, i.e., after pushing plunger 54 thereby at least partially removing at least one terminated cable assembly 4 from electrical connector assembly 6. Spring element 80 may be a metal spring (e.g., coil of wire) or any elastic device that regains its original shape after being compressed or extended, and may be constructed of any suitable material.

Figure 5A:
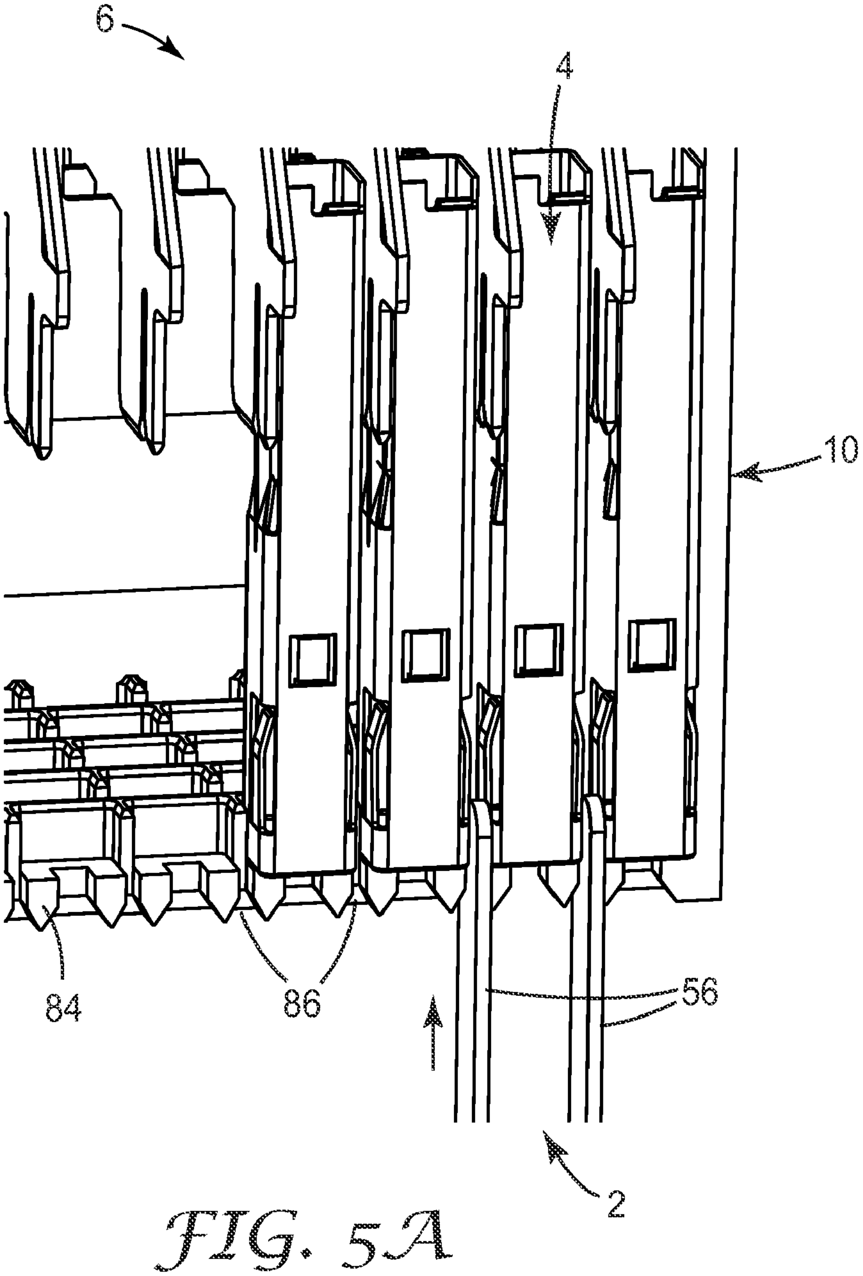
FIGS. 5A-5D are detailed perspective cutaway views of the tool of FIG. 1 in different stages of removing a terminated cable assembly from an electrical connector assembly.

FIGS. 5A-5D and 6 are detailed views of tool 2 in different stages of removing terminated cable assembly 4 from electrical connector assembly 6. FIG. 5A illustrates an initial stage wherein electrical connector assembly 6 and tool 2 are provided. Electrical connector assembly 6 includes a plurality of terminated cable assemblies 4. As shown in FIGS. 3A, 3B, and 4, tool 2 includes a housing 52 and a plunger 54. Housing 52 includes two tines 56 configured to unlatch at least one terminated cable assembly 4 from electrical connector assembly 6. Plunger 54 is supported by housing 52 and configured to at least partially remove at least one terminated cable assembly 4 from electrical connector assembly 6. As illustrated in FIG. 5A, tines 56 are inserted into electrical connector assembly 6. Tines 56 are spaced apart to straddle terminated cable assembly 4 during removal of terminated cable assembly 4 from electrical connector assembly 6. Connector assembly housing or adapter 10 of electrical connector assembly 6 includes a front exterior wall 84. Tines 56 enter electrical connector assembly 6 through front exterior wall 84. More specifically, front exterior wall includes a plurality of blade insertion apertures 86 configured to receive contact blades (e.g., ground contact blades) of a mating connector (not shown). As illustrated in FIG. 5A, tines 56 enter electrical connector assembly 6 through blade insertion apertures 86.

Figure 5B:
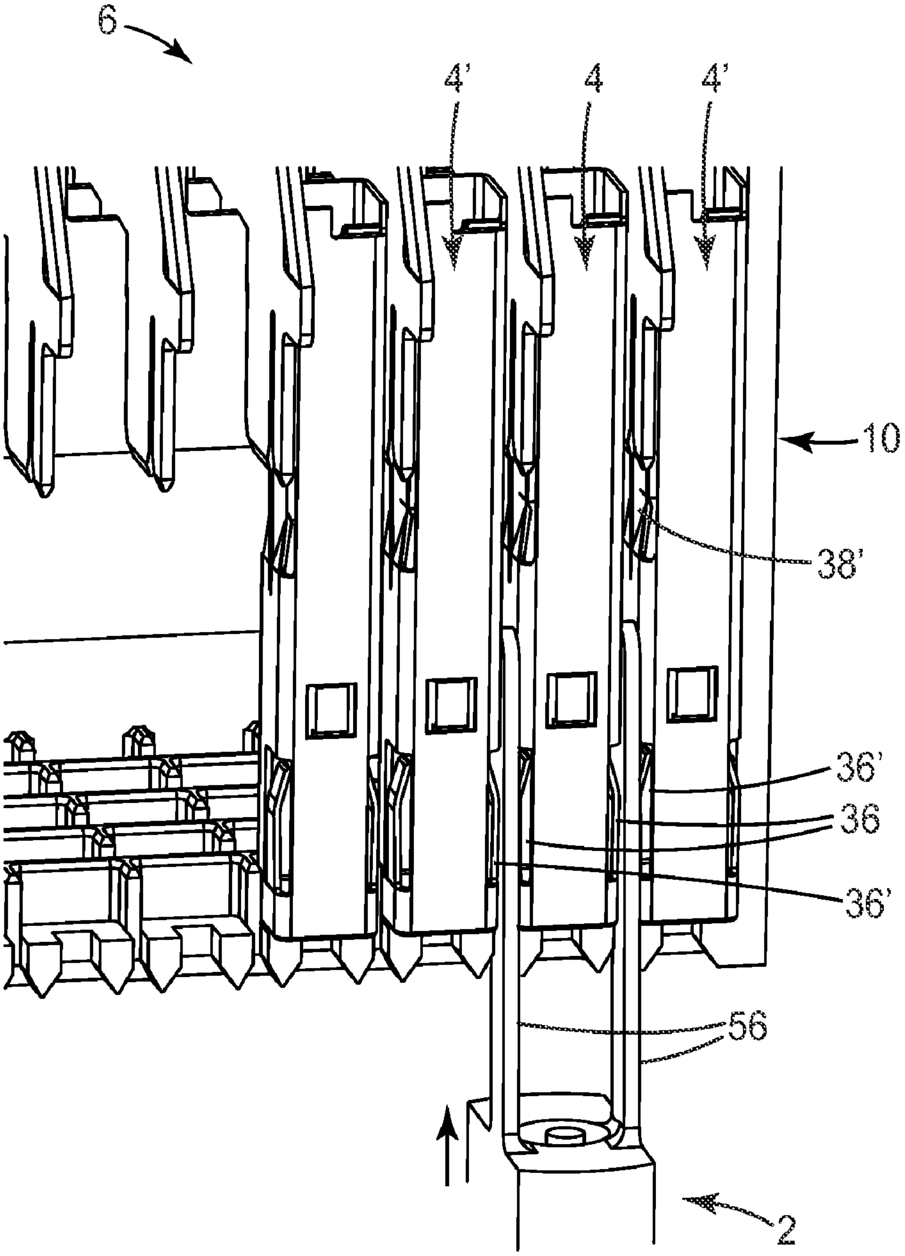
Figure 6:
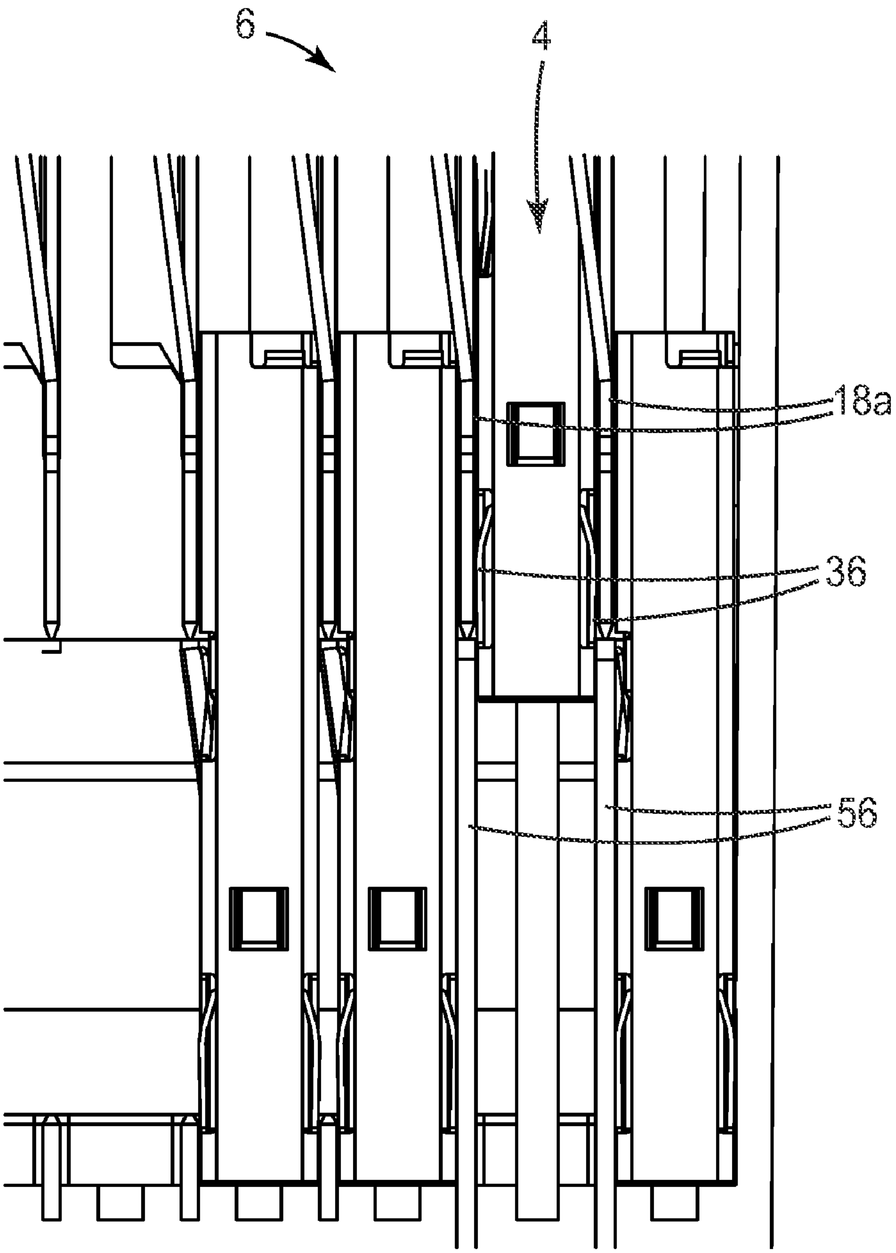
FIG. 6 is a detailed front cutaway view of the tool of FIG. 1 in the process of removing a terminated cable assembly from an electrical connector assembly.

FIG. 5B illustrates a stage wherein tines 56 of tool 2 are further inserted into electrical connector assembly 6, thereby deflecting contact elements 36 of terminated cable assembly 4. Deflecting contact elements 36 of terminated cable assembly 4 facilitates removal of terminated cable assembly 4 from electrical connector assembly 6. In one aspect, tines 56 may deflect only contact elements 36 of the one or more terminated cable assemblies 4 that are to be removed. In other aspects, tines 56 may, instead or in addition, deflect contact elements 36' of adjacent terminated cable assemblies 4'. Tines 56 prevent contact elements 36 and 36' from being damaged or causing damage or obstruction during removal of terminated cable assembly 4 from electrical connector assembly 6. In one embodiment, as illustrated in FIG. 6, tines 56 and metal plates 18*a* of organizer plate 8 are substantially flush, thereby preventing contact elements 36 from catching on metal plates 18*a* during removal of terminated cable assembly 4 from electrical connector assembly 6.

Figure 5C:
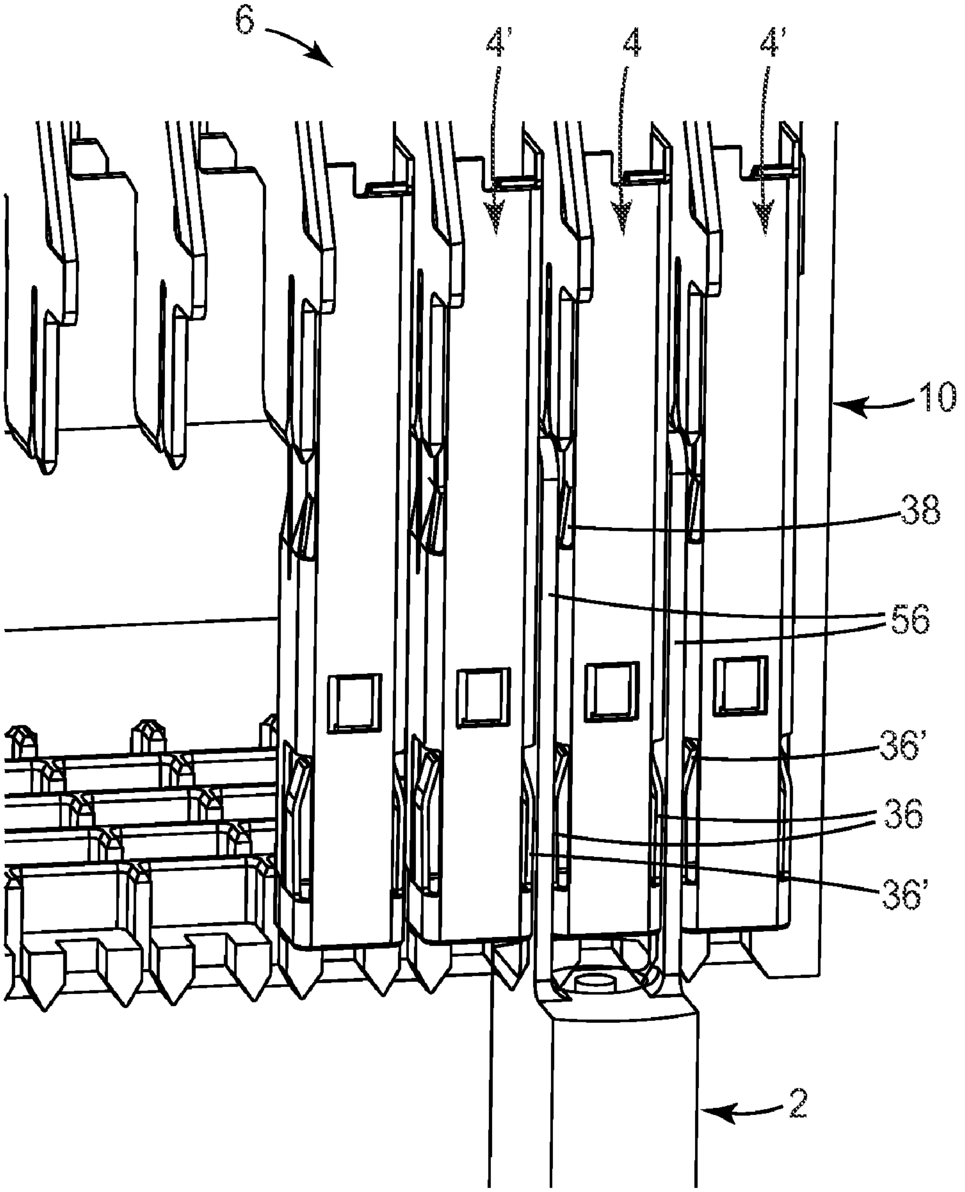

FIG. 5C illustrates a stage wherein tines 56 of tool 2 are fully inserted in electrical connector assembly 6. In this stage, tines 56 continue to deflect contact elements 36 of terminated cables assembly 4 and in addition unlatch terminated cable assembly 4 by deflecting latch member 38 of terminated cable assembly 4.

Figure 5D:
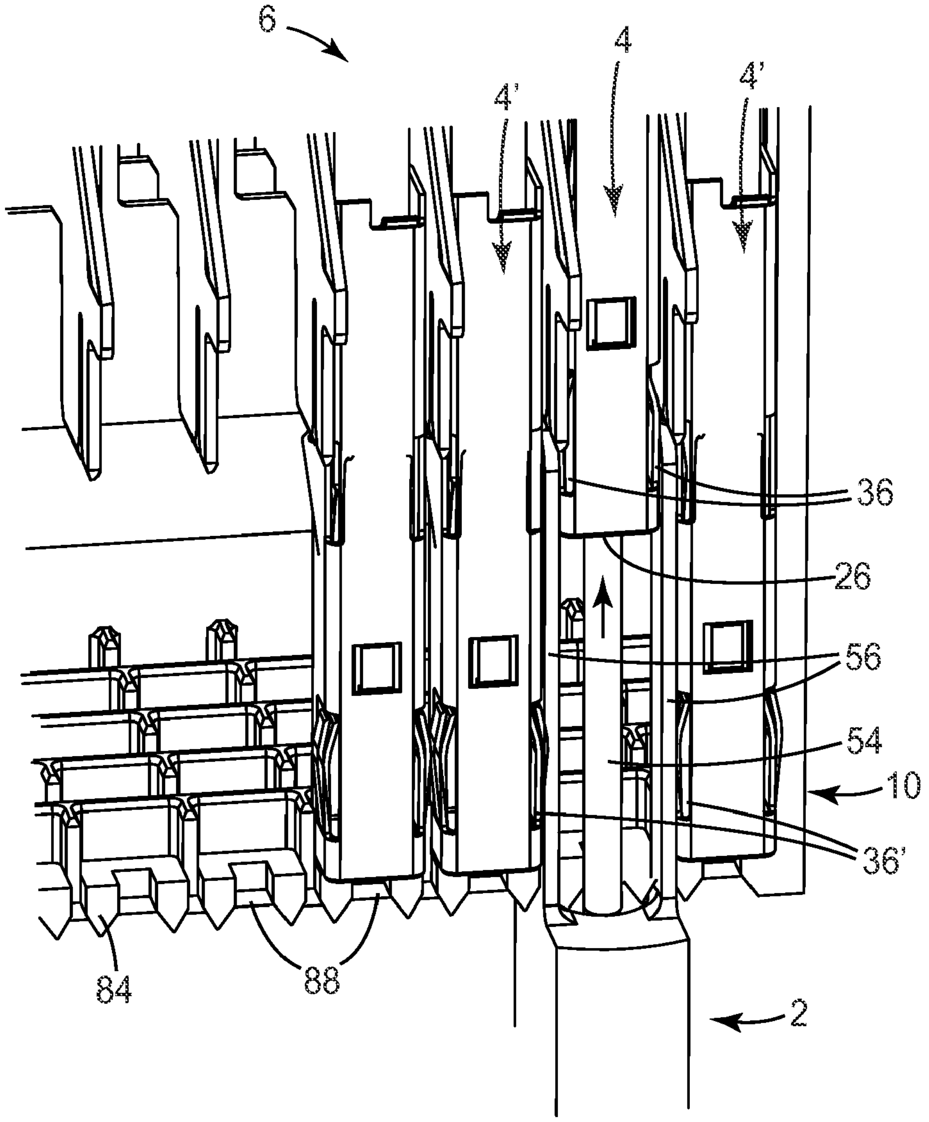

FIG. 5D illustrates a stage wherein plunger 54 of tool 2 is pushed against insulator 26 of terminated cable assembly 4, thereby at least partially removing terminated cable assembly 4 from electrical connector assembly 6. Tines 56 continue to deflect contact elements 36 of terminated cable assembly 4 to prevent contact elements 36 from being damaged or causing damage or obstruction. As shown in FIG. 5D, at least a portion of plunger 54 is positioned in between tines 56 during removal of terminated cable assembly 4 from electrical connector assembly 6. Connector assembly housing or adapter 10 of electrical connector assembly 6 includes a front exterior wall 84. Plunger 54 enters electrical connector assembly 6 through front exterior wall 84. More specifically, front exterior wall includes a plurality of pin insertion apertures 88 configured to receive contact pins (e.g., signal contact pins) of a mating connector (not shown). As illustrated in FIG. 5D, plunger 54 enters electrical connector assembly 6 through one of pin insertion apertures 88. Plunger 54 of tool 2 may be configured to only partially remove terminated cable assembly 4 from electrical connector assembly 6, after which terminated cable assembly 4 is removed from electrical connector assembly 6, e.g., by pulling on electrical cable 20 of terminated cable assembly 4, or by grabbing and pulling back end 32 of shield element 24 of terminated cable assembly 4. Alternatively, plunger 54 of tool 2 may be configured to completely remove terminated cable assembly 4 from electrical connector assembly 6 when pushed.

In addition to the partial or complete removal of one or more terminated cable assemblies 4 from electrical connector assembly 6, tool 2 may be used in the assembly of one or more terminated cable assemblies 4 into electrical connector assembly 6, e.g., to replace a terminated cable assembly 4 that has been removed for repair, or in the initial assembly process of electrical connector assembly 6. In an initial stage, electrical connector assembly 6 and tool 2 are provided. Electrical connector assembly 6 includes a plurality of terminated cable assemblies 4' each having one or more contact elements 36'. As shown in FIGS. 3A, 3B, and 4, tool 2 includes two tines 56. Tines 56 are configured to deflect contact elements 36'. Similar to the stages of removing a terminated cable assembly from an electrical connector assembly illustrated in FIGS. 5A-5C, tines 56 are inserted into electrical connector assembly 6, thereby deflecting contact elements 36' of terminated cable assemblies 4'. Deflecting contact elements 36' of terminated cable assemblies 4' facilitates insertion of a terminated cable assembly 4 into electrical connector assembly 6 adjacent terminated cable assemblies 4'. Tines 56 prevent contact elements 36 and 36' from being damaged or causing damage or obstruction during insertion of terminated cable assembly 4 into electrical connector assembly 6. In one aspect, tines 56 also deflect latch 38' (shown in FIG. 5B) of a terminated cable assembly 4' to further facilitate insertion of a terminated cable assembly 4 into electrical connector assembly 6 adjacent terminated cable assemblies 4', and prevent latch 38' from being damaged or causing damage or obstruction during insertion of terminated cable assembly 4 into electrical connector assembly 6. After tines 56 of tool 2 are inserted in electrical connector assembly 6, terminated cable assembly 4 is inserted into electrical connector assembly 6 adjacent terminated cable assemblies 4'. After terminated cable assembly is assembled in electrical connector assembly 6, tines 56 are removed from electrical connector assembly 6.

After using tool 2 to remove a terminated cable assembly 4 from electrical connector assembly 6, tines 56 of tool 2 may remain inserted in electrical connector assembly 6 to facilitate subsequent assembly of a replacement or repaired terminated cable assembly 4.

Figure 7:
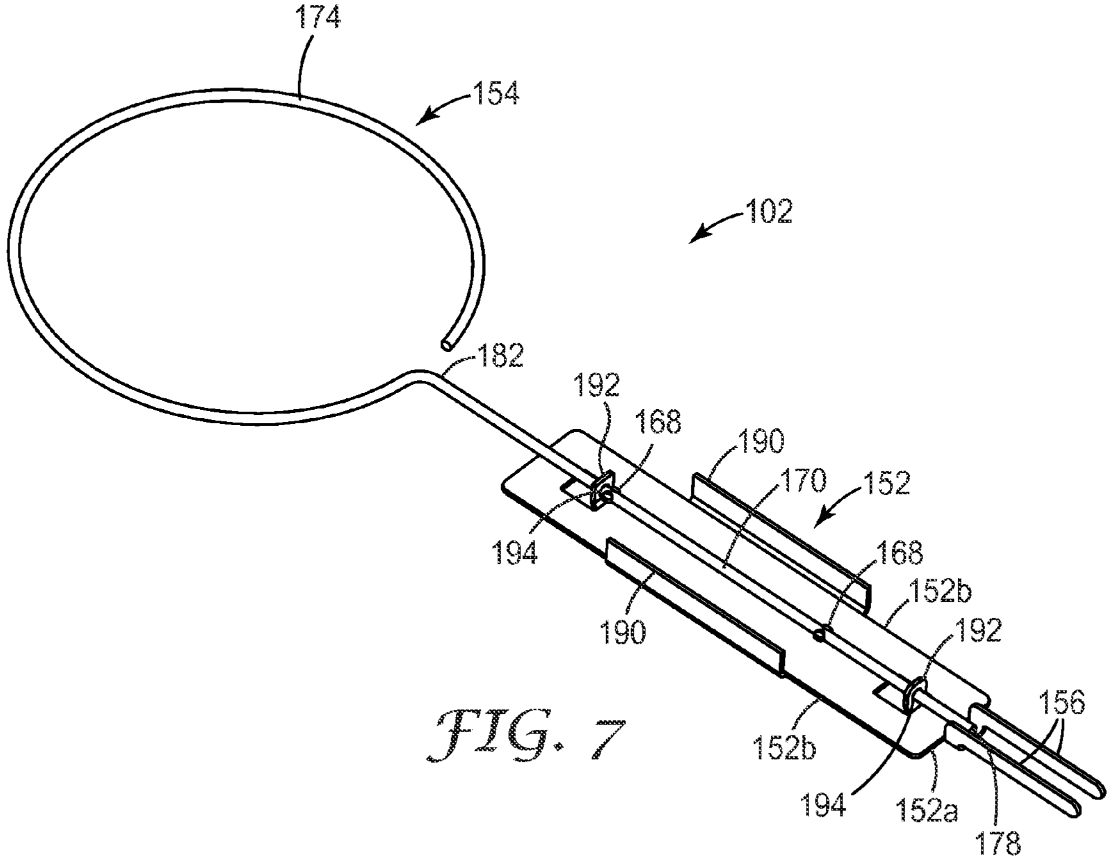
FIG. 7 is a perspective view of another exemplary embodiment of a tool according to an aspect of the present invention in an initial stage.

FIG. 7 illustrates another exemplary embodiment of a tool according to an aspect of the present invention. Tool 102 includes a housing 152 and a plunger 154. Housing 152 includes two tines 156 configured to unlatch at least one terminated cable assembly 4 from electrical connector assembly 6 and extend from a front end 152*a* of housing 152. Housing 152 further includes two flanges 190 extending from sides 152*b* of housing 152 and configured to assist in positioning tool 102 relative to electrical connector assembly 6. For example, tool 102 may be held between a human finger and thumb at flanges 190 to assist in inserting tines 156 into blade insertion apertures 86 of electrical connector assembly 6. In the embodiment of FIG. 7, flanges 190 extend substantially perpendicular to the major surface of housing 152. In other embodiments, flanges 190 may have a different shape and/or size, and may extend from housing 152 as is suitable for the intended application. Housing 152 further includes two plunger supports 192 configured to support plunger 154. Plunger supports 192 include plunger support openings 194 in which plunger 154 is positioned after assembly of plunger 154 in housing 152. In the embodiment of FIG. 7, plunger supports 192 extend substantially perpendicular to the major surface of housing 152. In other embodiments, one or more plunger supports 192 may be present, may have a different shape and/or size, and may extend from housing 152 as is suitable for the intended application. In the embodiment of FIG. 7, housing 152 is a one-part housing that includes tines 156, flanges 190, and plunger supports 192 in a monolithic configuration. This enables housing 152 including tines 156, flanges 190, and plunger supports 192 to be manufactured in a cost-effective and efficient manner, e.g., by making housing 152 including tines 156, flanges 190, and plunger supports 192 from sheet metal by conventional sheet metal stamping. In other embodiments, tines 156, flanges 190, and plunger supports 192 may be separate elements permanently or removably attached to housing 152. These elements may then be assembled to housing 152 using any suitable method/structure, including but not limited to snap fit, friction fit, press fit, mechanical clamping, soldering, welding, and adhesive.

Plunger 154 is supported by housing 152 and configured to at least partially remove at least one terminated cable assembly 4 from electrical connector assembly 6. Plunger 154 is cylindrical and is configured to slide relative to housing 152 during operation of tool 102. In the embodiment of FIG. 7, plunger 154 is supported by plunger supports 192 of housing 152 and configured to slide through plunger support openings 194. To facilitate support and precise movement of plunger 154 relative to housing 152, plunger support openings 194 may be substantially concentric with plunger 154, and may have a shape corresponding substantially with the cross-sectional shape of plunger 154. Plunger 154 includes a plunger body 170 and a plunger head 174.

Plunger body 170 is configured to slidably fit in housing 152 and may be configured to support a spring element (not shown). Plunger body 170 is cylindrical and has a diameter configured to facilitate accurate placement of front end 178 of plunger 154 against a single terminated cable assembly 4 to facilitate its removal from electrical connector assembly 6.

Plunger head 174 is configured for manual operation of tool 102 and is positioned at back end 182 of plunger 154. In the embodiment of FIG. 7, plunger head 174 is formed to accommodate manual operation. For example, plunger head 174 may be held between a human finger and thumb to assist in operating plunger 154. Plunger head 174 may be configured to support a spring element (not shown). In the embodiment of FIG. 7, plunger 154 is monolithic. This enables plunger body 170 and plunger head 174 to be manufactured in a cost-effective and efficient manner, e.g., by making plunger 154 including plunger body 170 and plunger head 174 from metal wire by conventional metal forming. In other embodiments, plunger head 174 may be a separate element permanently or removably attached to plunger body 170. Plunger head 174 may then be assembled to plunger body 170 using any suitable method/structure, including but not limited to snap fit, friction fit, press fit, mechanical clamping, soldering, welding, and adhesive.

As illustrated in FIG. 7, plunger 154 includes two stop elements 168 configured to limit movement of plunger 154 relative to housing 152. Stop elements 168 extend from plunger body 170 and are positioned in between and cooperate with plunger supports 192 to limit movement of plunger 154. The amount of movement of plunger 154 relative to housing 152 is determined by the relative locations of stop elements 168 and plunger supports 192. Stop elements 168 may be formed by locally deforming (i.e., displacing material of) plunger 154 after positioning plunger 154 in housing 152. In alternative embodiments, movement limitation of plunger 154 relative to housing 152 may be achieved by alternative designs of one or more stop elements 168.

In each of the embodiments and implementations described herein, the various components of the tool and elements thereof are formed of any suitable material. The materials are selected depending upon the intended application and may include both metals and non-metals (e.g., any one or combination of non-conductive materials including but not limited to polymers, glass, and ceramics). In one embodiment, first housing part 58 and plunger head 74 are formed of a polymeric material by methods such as injection molding, extrusion, casting, machining, and the like, while second housing part 60 including tines 56, plunger body 70, plunger extension 72, stop pin 68*b*, and spring element 80 are formed of metal by methods such as molding, casting, stamping, machining, and the like. Material selection will depend upon factors including, but not limited to, chemical exposure conditions, environmental exposure conditions including temperature and humidity conditions, flame-retardancy requirements, material strength, and rigidity, to name a few.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the mechanical, electro-mechanical, and electrical arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A tool comprising:

a housing having one or more longitudinal tines configured to unlatch at least one terminated cable assembly from an electrical connector assembly, the electrical connector assembly comprising a connector assembly housing having a front exterior wall; and a plunger supported by the housing and configured to enter the electrical connector assembly through the front exterior wall to at least partially remove the at least one terminated cable assembly from the electrical connector assembly, wherein the one or more tines are configured to deflect one or more contact elements and a latch member, both extending from a side surface of the terminated cable assembly, during insertion of the one or more tines into the electrical connector assembly to facilitate removal of the terminated cable assembly from the electrical connector assembly.

2. The tool of claim 1 further comprising a spring element configured to return the plunger to an initial stage.

3. The tool of claim 1 further comprising a stop pin configured to limit movement of the plunger relative to the housing.

4. The tool of claim 1, wherein the one or more tines are removably attached to the housing.

5. The tool of claim 1, wherein the housing comprises two or more tines configured to unlatch at least one terminated cable assembly from an electrical connector assembly, and wherein the two or more tines are spaced apart to straddle the at least one terminated cable assembly during removal of the at least one terminated cable assembly from the electrical connector assembly.

6. The tool of claim 1, wherein the housing comprises two or more tines configured to unlatch at least one terminated cable assembly from an electrical connector assembly, and wherein at least a portion of the plunger is positioned in between the two or more tines during removal of the at least one terminated cable assembly from the electrical connector assembly.

7. The tool of claim 1, wherein the plunger comprises a plunger head configured for manual operation of the tool.

8. The tool of claim 1, wherein the plunger comprises a plunger extension.

9. The tool of claim 8, wherein the plunger extension is removably attached to the plunger.

10. The tool of claim 1 further comprising at least one stop element configured to limit movement of the plunger relative to the housing.

11. The tool of claim 1, wherein the housing comprises one or more plunger supports.

12. The tool of claim 1, wherein the housing comprises two or more housing parts.

13. A method comprising:

providing an electrical connector assembly comprising a plurality of terminated cable assemblies and a connector assembly housing having a front exterior wall;

providing a tool comprising:

a housing having one or more longitudinal tines configured to unlatch at least one terminated cable assembly from the electrical connector assembly; and a plunger supported by the housing and configured to at least partially remove the at least one terminated cable assembly from the electrical connector assembly, wherein the one or more tines are configured to deflect one or more contact elements and a latch member, both extending from a side surface of the terminated cable assembly, during insertion of the one or more tines into the electrical connector assembly to facilitate removal of the terminated cable assembly from the electrical connector assembly;

inserting the one or more tines into the electrical connector assembly thereby deflecting the one or more contact elements and the latch member unlatching the at least one terminated cable assembly;

pushing the plunger, wherein the plunger enters the electrical connector assembly through the front exterior wall, thereby at least partially removing the at least one terminated cable assembly from the electrical connector assembly; and removing the at least one terminated cable assembly from the electrical connector assembly.

14. The method of claim 13, wherein the one or more tines enter the electrical connector assembly through the front exterior wall.

15. The method of claim 13, wherein the front exterior wall comprises a plurality of blade insertion apertures, and wherein the one or more tines enter the electrical connector assembly through one or more of the blade insertion apertures.

16. The method of claim 13, wherein the front exterior wall comprises a plurality of pin insertion apertures, and wherein the plunger enters the electrical connector assembly through one of the plurality of pin insertion apertures.

17. A method comprising:

providing an electrical connector assembly comprising a plurality of first terminated cable assemblies each having one or more contact elements extending from a side surface thereof;

providing a tool comprising one or more longitudinal tines configured to deflect the one or more contact elements;

inserting the one or more tines into the electrical connector assembly thereby deflecting at least one contact element of at least one first terminated cable assembly;

inserting at least one second terminated cable assembly into the electrical connector assembly adjacent the at least one first terminated cable assembly; and removing the one or more tines from the electrical connector assembly.

18. The method of claim 17, wherein the tool comprises two tines, and wherein the two tines are inserted into the electrical connector assembly thereby deflecting a contact element of two adjacent first terminated cable assemblies.

* * * * *